(12) United States Patent
Mihalcea et al.

(10) Patent No.: US 9,965,271 B2
(45) Date of Patent: May 8, 2018

(54) PROJECTION OF BUILD AND DESIGN-TIME INPUTS AND OUTPUTS BETWEEN DIFFERENT BUILD ENVIRONMENTS

(71) Applicant: Microsoft Technology Licensing, LLC, Redmond, WA (US)

(72) Inventors: Bogdan I. Mihalcea, Bothell, WA (US); Ankit Asthana, Redmond, WA (US); Marian Luparu, Redmond, WA (US); Olga Arkhipova, Woodinville, WA (US); Ion Todirel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/801,981

(22) Filed: Jul. 17, 2015

(65) Prior Publication Data
US 2016/0321033 A1   Nov. 3, 2016

Related U.S. Application Data

(60) Provisional application No. 62/153,997, filed on Apr. 28, 2015.

(51) Int. Cl.
*G06F 8/71* (2018.01)
*G06F 8/40* (2018.01)
*G06F 9/44* (2018.01)
*G06F 9/45* (2006.01)

(52) U.S. Cl.
CPC .................. *G06F 8/71* (2013.01); *G06F 8/40* (2013.01); *G06F 8/70* (2013.01)

(58) Field of Classification Search
CPC ..... G06F 8/20; G06F 8/30; G06F 8/40; G06F 8/41; G06F 8/71
See application file for complete search history.

(56) References Cited

U.S. PATENT DOCUMENTS 6,052,531 A * 4/2000 Waldin, Jr. ............... G06F 8/64
707/999.01
7,437,705 B1 10/2008 O'Bryan et al.
(Continued)

OTHER PUBLICATIONS

Wikipedia, "Makefile," 2015, pp. 1-3, downloaded from the Wayback Machine Internet Archive at <url>: http://web.archive.org/web/20150218021825/http://en.wikipedia.org/wiki/Makefile on Mar. 28, 2017.*

(Continued)

*Primary Examiner* — Thuy Dao
*Assistant Examiner* — Stephen Berman
(74) *Attorney, Agent, or Firm* — Fiala & Weaver P.L.L.C.

(57) ABSTRACT

Methods, systems, apparatuses, and computer program products are described that enable local builds to be substantially equivalent with remote builds. In embodiments, local build and design-time inputs and/or outputs of a local build environment hosted on a local computing device are projected to remote build and design-time inputs and/or outputs of a remote build environment hosted on a remote computing device. In further embodiments, remote build and design-time inputs and/or outputs of the remote build environment are projected to local build and design time inputs and/or outputs of the local build environment. In still further embodiments, first build and design-time inputs and/or outputs of a first build environment hosted on a computing device are projected to second build and design-time inputs and/or outputs of a second build environment hosted on the same computing device.

20 Claims, 6 Drawing Sheets

200

Identify a first build or design-time input of a first build environment hosted by a first computing device — 202

Project the first build or design-time input to a second build or design-time input of a second build environment hosted by a second computing device, the second build environment being different than the first build environment — 204

(56) References Cited

U.S. PATENT DOCUMENTS

| | | | |
|---|---|---|---|
| 7,437,717 B1 | 10/2008 | Cowan et al. | |
| 7,584,470 B2 | 9/2009 | Barker et al. | |
| 7,716,640 B2* | 5/2010 | Pik | G06F 8/20 717/100 |
| 7,774,754 B2 | 8/2010 | Komissarchik et al. | |
| 7,930,273 B1* | 4/2011 | Clark | G06F 8/71 707/638 |
| 8,091,066 B2 | 1/2012 | Fiore | |
| 8,327,354 B1* | 12/2012 | Magenheimer | G06F 9/45554 711/206 |
| 8,468,498 B2 | 6/2013 | Lee et al. | |
| 8,683,430 B2 | 3/2014 | Gonzales et al. | |
| 9,021,443 B1 | 4/2015 | Lachwani et al. | |
| 9,430,207 B1* | 8/2016 | Bandhole | G06F 8/38 |
| 9,823,909 B1 | 11/2017 | Kuo et al. | |
| 2006/0080638 A1 | 4/2006 | Fiore | |
| 2008/0216073 A1* | 9/2008 | Yates | G06F 9/30174 718/100 |
| 2011/0185346 A1* | 7/2011 | Andrade | G06F 8/60 717/151 |
| 2011/0239195 A1 | 9/2011 | Lin et al. | |
| 2011/0258595 A1* | 10/2011 | Clevenger | G06F 8/40 717/106 |
| 2012/0066673 A1* | 3/2012 | Miller, III | G06F 8/71 717/171 |
| 2014/0157226 A1 | 6/2014 | Dykstal et al. | |
| 2014/0282450 A1 | 9/2014 | Jubran et al. | |
| 2014/0359618 A1* | 12/2014 | Fontignie | G06F 8/63 718/1 |
| 2015/0128106 A1 | 5/2015 | Halley et al. | |
| 2015/0149978 A1* | 5/2015 | Kim | G06F 8/41 717/101 |
| 2017/0212752 A1* | 7/2017 | Ekambaram | G06F 8/71 |

OTHER PUBLICATIONS

Wikipedia, "zFS (IBM File System)," 2014, pp. 1-2, downloaded from the Wayback Machine Internet Archive at <url>: http://web.archive.org/web/20141013064707/http://en.wikipedia.org/wiki/ZFS_(IBM_file_system) on Mar. 28, 2017.*

Wikipedia, "Comparison of file systems," 2014, pp. 1-13, downloaded from the Wayback Machine Internet Archive at <url>: http://web.archive.org/web/20140307102132/http://en.wikipedia.org/wiki/Comparison_of_file_systems on Mar. 28, 2017.*

Wikipedia, "Data compression," 2015, downloaded from the Wayback Machine Internet Archive at <url>: http://web.archive.org/web/20150325124449/https://en.wikipedia.org/wiki/Data_compression on Feb. 28, 2017.*

Mecklenburg, Robert. "Managing Projects with GNU Make," 2005, pp. 129-136, downloaded from the Internet on Sep. 11, 2017 from <url>:http://www.oreilly.com/openbook/make3/book/ch07.pdf.*

Salma Charkaoui et al., "Cross-platform mobile development approaches," 2014, Third IEEE International Colloquium in Information Science and Technology (CIST), pp. 188-191, downloaded from the Internet at <url>http://:eeexplore.ieee.org.*

Spyros Xanthopoulos et al., "A comparative analysis of cross-platform development approaches for mobile applications," 2013, Proceedings of the 6th Balkan Conference in Informatics, pp. 213-220, downloaded from the Internet at <url>:https://dl.acm.org.*

Manuel Palmieri et al., "Comparison of cross-platform mobile development tools," 2012, 16th International Conference on Intelligence in Next Generation Networks (ICIN), pp. 179-186, downloaded from the Internet at <url>:http://ieeexplore.ieee.org.*

"Building Programs in Sun WorkShop TeamWare", Published on: Oct. 6, 2014, Available at: <http://docs.oracle.com/cd/E19957-01/806-3573/building.html>, 17 pages.

Purdie, Richard, "Yocto Project Reference Manual", Published on: Nov. 30, 2013, Available at: <http://www.yoctoproject.org/docs/current/ref-manual/ref-manual.html>, 198 pages.

"Remote Build Guide", Published on: Aug. 13, 2014, Available at: <http://docs.rhomobile.com/en/hosted/guide/remote-build-guide>, 11 pages.

"IronWorker Local and Remote Builds", Published on: Sep. 16, 2013, Available at: <http://dev.iron.io/worker/reference/builds/>, 2 pages.

"Non-Final Office Action Issued in U.S. Appl. No. 15/631,930", dated Dec. 26, 2017, 19 Pages.

* cited by examiner

PROJECTION OF BUILD AND DESIGN-TIME INPUTS AND OUTPUTS BETWEEN DIFFERENT BUILD ENVIRONMENTS

CROSS-REFERENCE TO RELATED APPLICATIONS

This application claims the benefit of U.S. Provisional Patent Application No. 62/153,997, filed on Apr. 28, 2015, the entirety of which is incorporated by reference herein.

BACKGROUND

Various types of software development applications exist that software developers may use to develop software. An integrated development environment (IDE) is a type of software development application that contains several development tools in one package. An IDE may include tools such as a source code editor, a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Many conventional software development applications are capable of providing intelligent assistance to developers writing code. This helps the developers write their code in a faster, more efficient manner. Such intelligent assistance may be provided in various ways. For instance, software development tools may include functionality that presents lists of possible code "completions" referred to as "autocompletion," lists of valid members of a type, information about parameters required by a method, and further types of assistance. In one example, Microsoft® Visual Studio® includes a tool referred to as IntelliSense® that implements functions such as these.

A development application may enable a developer to develop program code directed to more than one context. For instance, a developer may develop program code to be directed to multiple operating systems (OS), such as Microsoft Windows®, Apple iOS™, and/or Google Android™. In this manner, an application defined by the program code may be enabled to operate on a variety of device platforms.

SUMMARY

Methods, systems, apparatuses, and computer program products are described herein for enabling local builds to be substantially equivalent with remote builds. In embodiments, local build and design-time inputs and/or outputs of a local build environment hosted on a local computing device are projected to remote build and design-time inputs and/or outputs of a remote build environment hosted on a remote computing device. In further embodiments, remote build and design-time inputs and/or outputs of the remote build environment are projected to local build and design time inputs and/or outputs of the local build environment. In still further embodiments, first build and design-time inputs and/or outputs of a first build environment hosted on a computing device are projected to second build and design-time inputs and/or outputs of a second build environment hosted on the same computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
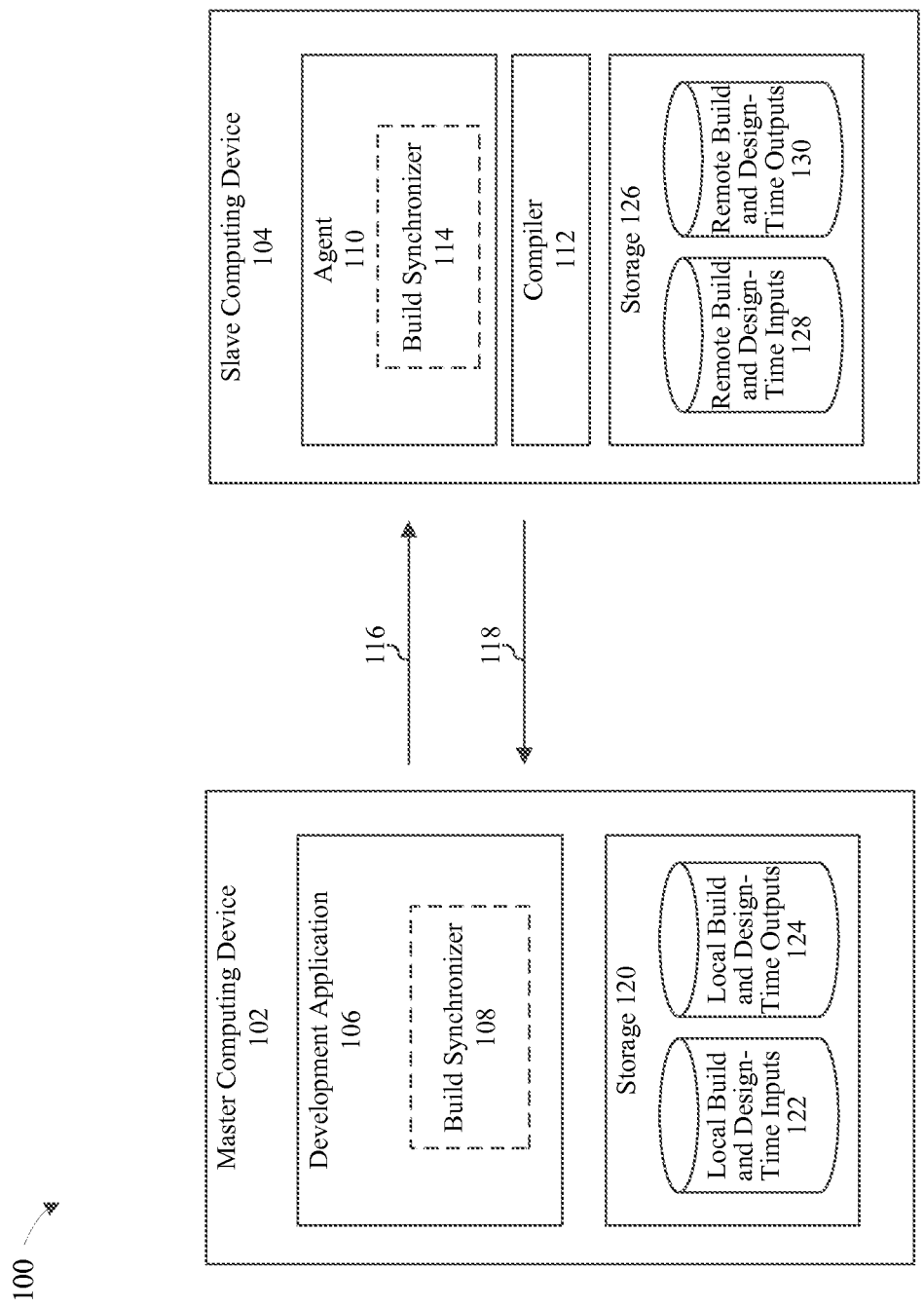
FIG. 1 is a block diagram of a software development system that enables the projection of build and design-time inputs and outputs between local and remote build environments, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Projecting Build and Design-Time Inputs and Outputs Between Build Environments Embodiments described herein enable the projection of build and design-time inputs and outputs between a local build environment hosted on a local (e.g., master) computing device and a remote build environment hosted on a remote (e.g., slave, client, agent) computing device. Embodiments enable local build environments to be maintained in synchronization with remote build environments. Such synchronization can help ensure that builds are executed correctly and can also help aid in the delivery of accurate intelligent assistance (e.g., Intellisense®), build error messages, and the like. Such synchronization may be enabled even when the local and remote computing devices implement different operating systems (e.g., Microsoft® Windows® versus Apple OSX™).

In one aspect, by enabling local build and design-time inputs (e.g., project files, source code, assets referenced by source code, build environment settings, and the like) to be projected to remote build and design-time inputs, the ease and likelihood of successfully executing a build on a remote computing device can be increased. In another aspect, by enabling remote build and design-time outputs (e.g., binaries, log files, and the like) to be projected to local build and design-time outputs, a code editing/development experience on the local computing device may be enhanced in that local projections of remote build outputs can be used to accurately provide intelligent assistance, identify build errors, and the like.

Embodiments described herein also enable the projection of build and design-time inputs and outputs between a first build environment hosted on a computing device and a second build environment hosted on the same computing device.

Embodiments are described in the following sections. For instance, exemplary systems for projecting build and design-time inputs and outputs between local and remote build environments are described in the next subsection, followed by a subsection providing exemplary process embodiments for projecting build and design-time inputs and outputs between local and remote build environments. Furthermore, example embodiments for projecting build and design-time inputs and outputs between different build environments hosted on the same computing device are described in a subsequent subsection.

A. Exemplary System Embodiments for Projecting Build and Design-Time Inputs and Outputs Between Local and Remote Build Environments Embodiments may be implemented in various ways. For instance, FIG. 1 shows a software development system 100 configured to enable the projection of build and design-time inputs and outputs between local and remote build environments, according to an example embodiment. As shown in FIG. 1, system 100 includes a master computing device 102 and a slave computing device 104. Master computing device 102 includes a development application 106 and storage 120, and slave computing device 104 includes an agent 110, a compiler 112, and storage 126. Development application 106 includes a build synchronizer 108 and/or agent 110 includes a build synchronizer 114. Storage 120 stores local build and design-time inputs 122 and local build and design-time outputs 124. Storage 126 stores remote build and design-time inputs 128 and remote build and design-time outputs 130.

Master computing device 102 is considered a "local" or master computing device with respect to the development of program code, and slave computing device 104 is considered a "remote," client, or slave computing device with respect to the development of program code in association with master computing device 102.

Development application 106 of master computing device 102 enables a user, or "developer" to develop source code (program code; software) in the form of mobile or desktop programs, applications, apps, etc. Development application 106 may enable the user to enter and edit source code, to compile the source code, to debug the source code, etc. Development application 106 enables the source code under development to be directed to more than one type of platform. For instance, the source code may be directed to more than one type of operating system, such as one or more of Microsoft Windows®, Apple iOS™, and/or Google Android™, and/or more than one version of the same operating system, such as one or more of Microsoft® Windows® 7, Microsoft® Windows® 8, and/or Microsoft® Windows® 10.

In embodiments, development application 106 at master computing device 102 communicates with one or more agents at other computing devices, such as agent 110 at slave computing device 104. Development application 106 communicates with agent 110 to cause a build to be performed at slave computing device 104 on program code. The build at slave computing device 104 may be performed during the process of developing an application to operate on slave computing device 104, which may have differences from master computing device 102 (e.g., different device type, different operating system, different operating system version).

For example, as shown in FIG. 1, development application 106 may transmit build generation information 116 to agent 110 for a particular application under development. Build generation information 116 may comprise a package or other data structure generated by development application 106 that includes information that enables the particular application to undergo a build at slave computing device 104. For instance, build generation information 116 may include one or more command lines, wherein each command line is text or other data structure that is an instruction, such an instruction for execution of a build, and that may each include one or more "switches" (e.g., preceded by a slash "/" or a dash "-") that indicate build options for the instruction. Build generation information 116 may also include further information such as source code of the particular application, one or more assets referenced by the source code, and/or other information for enabling a build of the application at slave computing device 104.

Agent 110 is configured to instruct compiler 112 to perform a build based on build generation information 116. For instance, agent 110 and/or compiler 112 may execute the one or more command lines received in build generation information 116 to cause compiler 112 to perform the build. In one embodiment, performing a build comprises at least compiling and/or linking source code. The source code used to perform the build may have been received as part of build generation information 116 or may have already been stored at slave computing device 104. According to the build, compiler 112 is configured to compile the source code into a build package that is directed to a particular platform of slave computing device 104, and which includes the compiled source code in the form of machine code (in one or more files) that can be executed at slave computing device 104. Agent 110 may cause the machine code to be executed at slave computing device 104 so that the machine code (and thereby the source code) defining the application can be debugged remotely by development application 106.

Note that master computing device 102 and slave computing device 104 may be directly coupled by a cable or other direct link, or may include at least one network interface that enables communications over a network. Examples of applicable communication links/networks/interfaces include IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, a local area network (LAN), a wide area network (WAN), a personal area network (PAN), and/or a combination of communication networks, such as the Internet.

Through interaction with development application 106, a user may cause one or more local build and design-time inputs 122 to be generated or otherwise stored on master computing device 102. Such inputs may include, for example and without limitation, source code files, assets that may be referenced by source code files (e.g., code libraries, content such as images, audio files, video files, and the like), build environment settings, and project files. As will be readily understood by persons skilled in the relevant art(s), a project file comprises a file that includes information (e.g., code) that controls how a build platform processes and builds software. For example, in a case in which development application 106 comprise Microsoft® Visual Studio®, the project files included within local build and design-time inputs 122 may contain XML code that executes when a user thereof builds a project using the build platform MSBuild. The project file may specify variables for the build process, inputs to the build process such as code files, and execution instructions for the build process. Different build platforms may require the use of project files that have different formats, content, or the like.

In an embodiment, build synchronizer 108 is operable to project any such local build and design-time inputs 122 that are suitable for conducting a build in a first context of master computing device 102 (e.g., in a build environment executing on a first operating system of master computing device 102) to remote build and design-time inputs 128 that are suitable for conducting a build in a second context of slave computing device 104 (e.g., in a build environment executing on a second operating system of slave computing device 104).

Thus, for example, build synchronizer 108 may be operable to project a local project file that is suitable for managing a build in a first context of master computing device 102 to a remote project file that is suitable for managing a build in a second context of slave computing device 104. In accordance with one specific, non-limiting example, build synchronizer 108 may project a local project file that is suitable for managing a build on an MSBuild platform that executes on a Microsoft® Windows® operating system to a remote project file that is suitable for managing a build on an Xcode® platform that executes on iOS®. Such projection may entail automatically creating a remote project file that has a different form and/or a different content than the local project file, but achieves identical or substantially similar build management goals. Such projection may also entail selectively modifying one or more portions of the local project file to produce the remote project file.

In further accordance with the foregoing example, build synchronizer 108 may update the remote project file whenever a user modifies the local project file, so that changes made to one are reflected in the other. In this manner, the remote project file may be kept current and available for use when a user of development application 106 wants to conduct a build on slave computing device 104. Conversely, build synchronizer 108 may also update the local project file anytime a user modifies the remote project file, so that changes made to one are reflected in the other. In either case, build synchronizer 108 may apply suitable changes to ensure that each project file is suitable for its respective context.

By automatically creating a remote projection of the local project file and keeping both project files synchronized, an embodiment ensures that software can be built in a consistent manner across different platforms/contexts and also reduces the work of the developer, since the developer will not need to manually create and maintain different project files for different machines.

As another example of the projection of local build and design-time inputs 122, build synchronizer 108 may be operable to project a local asset (e.g., an asset that is referenced by a source code file) that is suitable for use in a first context of master computing device 102 to a remote asset that is suitable for use in a second context of slave computing device 104. In accordance with one specific, non-limiting example, build synchronizer 108 may project a local image file that is encoded in a first file format (e.g., JPEG) to a remote image file that is encoded in a second file format (e.g., PNG). This may be carried out, for example, if JPEG files render successfully in the first context but do not render successfully in the second context, such that a different encoding format may be desired. Such projection may entail automatically creating a remote asset that has a different form and/or a different content than the local asset. Such projection may also entail selectively modifying one or more portions of the local asset to produce the remote asset.

In further accordance with the foregoing example, build synchronizer 108 may update the remote asset any time a user modifies the local asset, so that changes made to one are reflected in the other. Conversely, build synchronizer 108 may also update the local asset any time a user modifies the remote asset, so that changes made to one are reflected in the other. In either case, build synchronizer 108 may apply suitable changes to ensure that the asset is suitable for its respective context.

By automatically creating a remote projection of the local asset and keeping both assets synchronized, an embodiment ensures that software can be built in a consistent manner across different platforms/contexts and also reduces the work of the developer, since the developer will not need to create and maintain different assets for different machines.

As yet another example of the projection of local build and design-time inputs 122, build synchronizer 108 may be operable to project a local source code file that is suitable for compiling in a first context of master computing device 102 to a remote source code file that is suitable for compiling in a second context of slave computing device 104. The projection of the local source code file may entail automatically creating a remote source code file that has a different form and/or a different content than the local source code file or selectively modifying one or more portions of the local source code file to produce the remote source code file. In accordance with one specific, non-limiting example, a local source code file may specify a header file include path wherein the path specified is meaningful and correct with respect to a file system of master computing device 102 but is not meaningful and correct with respect to a file system of slave computing device 104. In further accordance with this example, build synchronizer 108 may be operable to project the local source code file into a remote source code file in which the header file include path has been modified so that it is meaningful and correct with respect to the file system of slave computing device 104.

In further accordance with the foregoing example, build synchronizer 108 may update the remote source code file anytime a user modifies the local source code file, so that changes made to one are reflected in the other. Conversely, build synchronizer 108 may also update the local source code file anytime a user modifies the remote source code file, so that changes made to one are reflected in the other. In either case, build synchronizer 108 may apply suitable changes to ensure that source code file is suitable for its respective context.

By automatically creating a remote projection of the local source code file and keeping both source code files synchronized, an embodiment ensures that software can be built in a consistent manner across different platforms/contexts and also reduces the work of the developer, since the developer will not need to maintain different source code files for different machines.

As still another example of the projection of local build and design-time inputs 122, build synchronizer 108 may be operable to project certain local build environment settings of master computing device 102 to corresponding remote build environment settings of slave computing device 104. Such settings may include for example Internet Protocol (IP) settings, a computer name, user identification or authentication information needed for digitally signing applications, or the like.

Although the foregoing features relating to the projection of build and design-time inputs between local and remote build environments are described as being performed by build synchronizer 108 installed on master computing device 102, it is to be understood that such features may alternatively be implemented by build synchronizer 114 that is installed on slave computing device 104. In still further embodiments, such features may be handled in a distributed manner with various operations being performed by build synchronizer 108 and other operations being performed by build synchronizer 114.

As noted above, a user of development application 106 may interact therewith to cause remotely-executing compiler 112 to perform a build based on build generation information 116. As a result of the performance of such a build, one or more remote build and design-time outputs 130 may be generated and stored on slave computing device 104, as well as transmitted to master computing device 102 as build output information 118. In an embodiment, build synchronizer 108 is operable to project any such remote build and design-time outputs 130 that are meaningful in a second context of slave computing device 104 (e.g., in a build environment executing on a second operating system of slave computing device 104) to local build and design-time outputs 124 that are meaningful in a first context of master computing device 102 (e.g., in a build environment executing on a first operating system of master computing device 102).

Thus, for example, build synchronizer 108 may be operable to project a remote log file that is output as the result of the performance of a build by compiler 112 and that is meaningful and correct in a second context of slave computing device 104 to a local log file that is meaningful and correct in a first context of first computing device 102. The projection of the remote log file may entail automatically creating a local log file that has a different form and/or a different content than the remote log file or selectively modifying one or more portions of the remote log file to produce the local log file. In accordance with one specific, non-limiting example, build synchronizer 108 may project a remote log file that includes error messages that reference certain file paths and/or file names that are meaningful and correct with respect to a file system of slave computing device 104 but are not meaningful and correct with respect to a file system of master computing device 102 to a local log file in which the file paths and/or file names have been modified to be meaningful and correct with respect to the file system of master computing device 102. The projection of the remote log file to the local log file may include many other changes to the form and/or content of the remote log file.

By automatically creating a local projection of the remote log file, an embodiment ensures that such log file can be used on master computing device 102 to accurately provide intelligent assistance, identify build errors, and the like.

For example, in one embodiment, development application 106 may be configured to present via a graphical user interface thereof a list of build errors that occurred during the performance of a build. Development application 106 may be further configured to present via the same graphical user interface a user-actuatable link associated with each build error. If a user (e.g., a developer) activates (e.g., clicks on) a user-actuatable link associated with a particular build error, development application 106 will utilize a file path, file name and line number associated with the error to present to the user via the same graphical user interface the actual code which caused the error to be generated. Such file path, file name and line number information may be obtained from the log file that was generated during the build. This functionality can help the user determine why the build failed and correct the problem.

However, if the build was performed on slave computing device 104, then the build error file paths and file names that are included in the remote log file may only be meaningful and correct with a respect to a file system utilized by slave computing device 104. If development application 106 utilized such file path and file name information to access a file system on master computing device 102, development application 106 would not be able to locate the actual code that caused the build error. Thus, the aforementioned functionality would not work. To address this issue, as mentioned above, an embodiment may project a remote log file that includes error messages that reference certain file paths and/or file names that are meaningful and correct with respect to a file system of slave computing device 104 but are not meaningful and correct with respect to a file system of master computing device 102 to a local log file in which the file paths and/or file names have been modified to be meaningful and correct with respect to the file system of master computing device 102. By so doing, it can be ensured that the aforementioned functionality will work correctly.

In certain embodiments, build synchronizer 108 translates between the remote file system file paths and file names and the local file system file paths and file names using techniques described in co-owned and commonly-pending U.S. patent application Ser. No. 14/749,164 entitled "Mapping Between Local and Remote for Seamless Build and Design Time Experience," filed Jun. 24, 2015, the entirety of which is incorporated by reference herein. However, this is only an example, and other techniques may be used to translate between the remote file system file paths and file names and the local file system file paths and file names.

As another example of the projection of remote build and design-time outputs 130, build synchronizer 108 may be operable to project one or more binaries output by a build process performed on slave computing device 104 and suitable for execution within a first context of slave computing device 104 to one or more corresponding binaries suitable for execution within a second context of master computing device 102. Projecting the remotely-generated binaries to binaries suitable for local execution on master computing device 102 may comprise, for example, and without limitation, changing the format and/or content of an executable (e.g., .exe) file, changing a name of an executable file, changing a manner in which an executable file is digitally signed, or the like. However, these are only examples and are by no means intended to be limiting.

Although the foregoing features relating to the projection of build and design-time outputs between local and remote build environments are described as being performed by build synchronizer 108 installed on master computing device 102, it is to be understood that such features may alternatively be implemented by build synchronizer 114 that is installed on slave computing device 104. In still further embodiments, such features may be handled in a distributed manner with various operations being performed by build synchronizer 108 and other operations being performed by build synchronizer 114.

Figure 2:
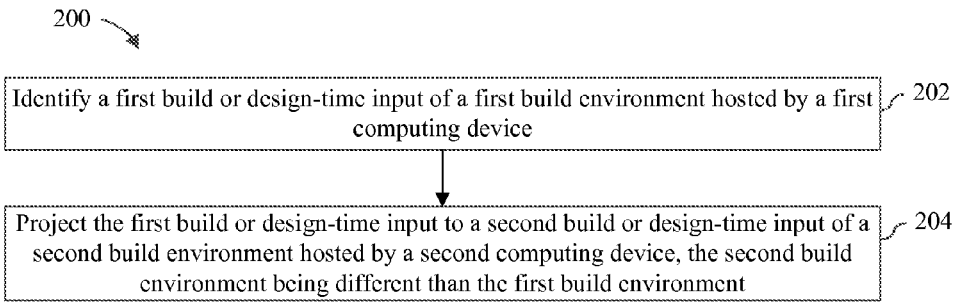
FIG. 2 is a flowchart of a first method for synchronizing a first build environment hosted by a first computing device with a second build environment hosted by a second computing device, according to an embodiment.

B. Exemplary Process Embodiments for the Projection of Build and Design-Time Inputs and Outputs Between Local and Remote Build Environments To help further illustrate a manner of operation of the embodiments described herein, FIG. 2 depicts a flowchart 200 of a first method for synchronizing a first build environment hosted by a first computing device with a second build environment hosted by a second computing device, according to an embodiment. The steps of flowchart 200 may be performed, for example, by build synchronizer 108 and/or build synchronizer 114 as discussed above in reference to system 100. However, the method is not limited to that embodiment.

As shown in FIG. 2, the method of flowchart 200 begins at step 202 in which a first build or design-time input of a first build environment hosted by a first computing device is identified. As discussed above, the first build or design-time input may comprise, for example and without limitation, a project file, a source code file, an asset referenced by a source code file, or build environment settings.

At step 204, the first build or design-time input is projected to a second build or design time input of a second build environment hosted by a second computing device, wherein the second build environment is different than the first build environment. The differences between the first build environment and the second build environment may include, but are not limited to, different operating systems, different file systems and file system resource paths, different compilers, different build engines, or the like. Projecting the first build or design-time input to the second build or design-time input may comprise automatically creating a second build or design-time input that has a different form and/or a different content than the first build or design-time input or selectively modifying one or more portions of the first build or design-time input to produce the second build or design-time input.

Figure 3:
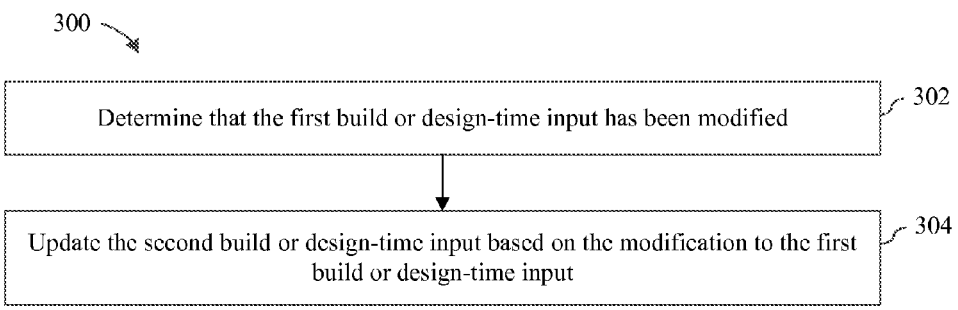
FIG. 3 is a flowchart of a second method for synchronizing a first build environment hosted by a first computing device with a second build environment hosted by a second computing device, according to an embodiment.

FIG. 3 depicts a flowchart 300 of a second method for synchronizing a first build environment hosted by a first computing device with a second build environment hosted by a second computing device, according to an embodiment. The steps of flowchart 300 may be performed, for example, by build synchronizer 108 and/or build synchronizer 114 as discussed above in reference to system 100. However, the method is not limited to that embodiment.

The method of flowchart 300 is premised on the assumption that the method of flowchart 200 has already been performed. Thus, there exists both the first build or design time input and the second build or design-time input that is a projection thereof. As shown in FIG. 3, the method of flowchart 300 begins at step 302 in which it is determined that the first build or design-time input has been modified. For example, this step may involve determining that a project file, a source code file, an asset referenced by a source code file, or build environment settings of the first build environment has been modified.

At step 304, in response to the determination that the first build or design-time input has been modified, the second build or design-time input is automatically modified based on the modification to the first build or design-time input. For example, this step may entail modifying a project file, a source code file, an asset referenced by a source code file, or build environment settings of the second build environment to reflect the change made to the first build or design-time input of the first build environment.

Figure 4:
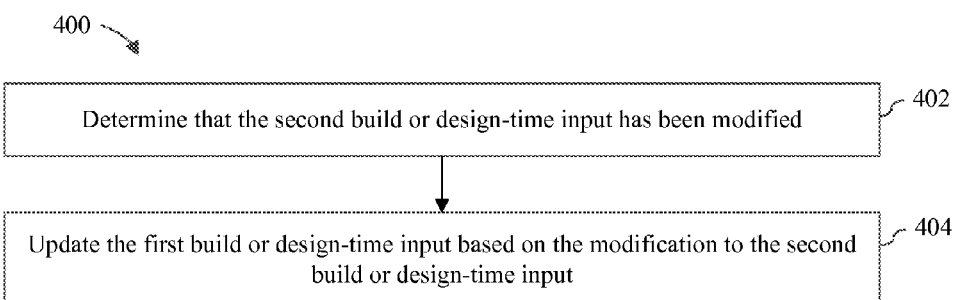
FIG. 4 is a flowchart of a third method for synchronizing a first build environment hosted by a first computing device with a second build environment hosted by a second computing device, according to an embodiment.

FIG. 4 depicts a flowchart 400 of a third method for synchronizing a first build environment hosted by a first computing device with a second build environment hosted by a second computing device, according to an embodiment. The steps of flowchart 400 may be performed, for example, by build synchronizer 108 and/or build synchronizer 114 as discussed above in reference to system 100. However, the method is not limited to that embodiment.

The method of flowchart 400 is also premised on the assumption that the method of flowchart 200 has already been performed. Thus, there exists both the first build or design time input and the second build or design-time input that is a projection thereof. As shown in FIG. 4, the method of flowchart 400 begins at step 402 in which it is determined that the second build or design-time input has been modified. For example, this step may involve determining that a project file, a source code file, an asset referenced by a source code file, or build environment settings of the second build environment has been modified.

At step 404, in response to the determination that the second build or design-time input has been modified, the first build or design-time input is automatically modified based on the modification to the second build or design-time input. For example, this step may entail modifying a project file, a source code file, an asset referenced by a source code file, or build environment settings of the first build environment to reflect the change that was made to the second build or design-time input of the second build environment.

Figure 5:
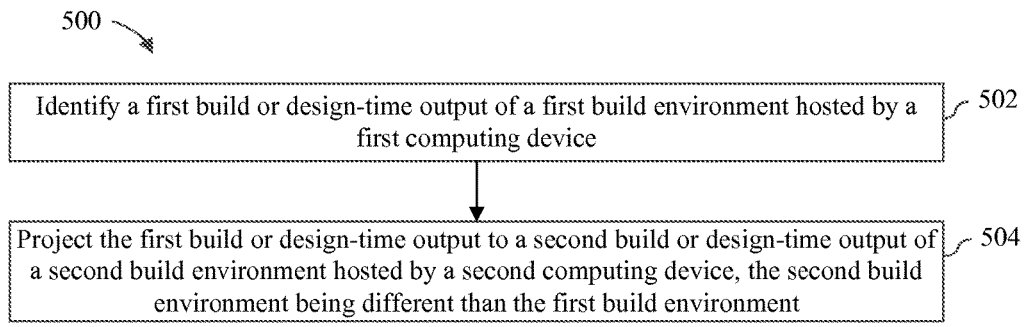
FIG. 5 is a flowchart of a fourth method for synchronizing a first build environment hosted by a first computing device with a second build environment hosted by a second computing device, according to an embodiment.

FIG. 5 depicts a flowchart 500 of a fourth method for synchronizing a first build environment hosted by a first computing device with a second build environment hosted by a second computing device, according to an embodiment. The steps of flowchart 500 may be performed, for example, by build synchronizer 108 and/or build synchronizer 114 as discussed above in reference to system 100. However, the method is not limited to that embodiment.

As shown in FIG. 5, the method of flowchart 500 begins at step 502 in which a first build or design-time output of a first build environment hosted by a first computing device is identified. As discussed above, the first build or design-time output may comprise, for example and without limitation, one or more binaries or a log file.

At step 504, the first build or design-time output is projected to a second build or design-time output of a second build environment hosted by a second computing device, wherein the second build environment is different than the first build environment. The differences between the first build environment and the second build environment may include, but are not limited to, different operating systems, different file systems and file system resource paths, different compilers, different build engines, or the like. Projecting the first build or design-time output to the second build or design-time output may comprise automatically creating a second build or design-time output that has a different form and/or a different content than the first build or design-time output or selectively modifying one or more portions of the first build or design-time output to produce the second build or design-time output.

Figure 6:
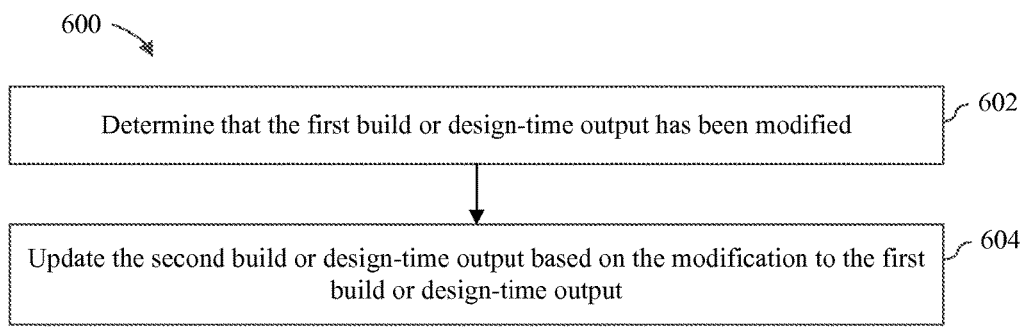
FIG. 6 is a flowchart of a fifth method for synchronizing a first build environment hosted by a first computing device with a second build environment hosted by a second computing device, according to an embodiment.

FIG. 6 depicts a flowchart 600 of a fifth method for synchronizing a first build environment hosted by a first computing device with a second build environment hosted by a second computing device, according to an embodiment. The steps of flowchart 600 may be performed, for example, by build synchronizer 108 and/or build synchronizer 114 as discussed above in reference to system 100. However, the method is not limited to that embodiment.

The method of flowchart 600 is premised on the assumption that the method of flowchart 500 has already been performed. Thus, there exists both the first build or design time output and the second build or design-time output that is a projection thereof. As shown in FIG. 6, the method of flowchart 600 begins at step 602 in which it is determined that the first build or design-time output has been modified. For example, this step may involve determining that one or more binaries or a log file of the first build environment has been modified.

At step 604, in response to the determination that the first build or design-time output has been modified, the second build or design-time output is automatically modified based on the modification to the first build or design-time output. For example, this step may entail modifying one or more binaries or a log file of the second build environment to reflect the change made to the first build or design-time output of the first build environment.

Figure 7:
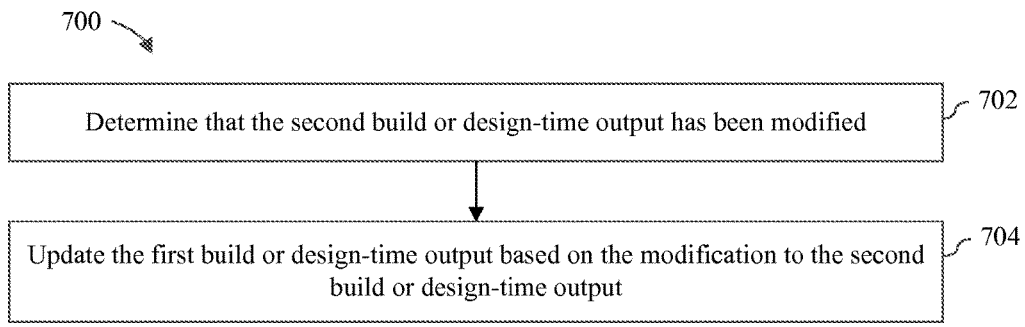
FIG. 7 is a flowchart of a sixth method for synchronizing a first build environment hosted by a first computing device with a second build environment hosted by a second computing device, according to an embodiment.

FIG. 7 depicts a flowchart 700 of a sixth method for synchronizing a first build environment hosted by a first computing device with a second build environment hosted by a second computing device, according to an embodiment. The steps of flowchart 700 may be performed, for example, by build synchronizer 108 and/or build synchronizer 114 as discussed above in reference to system 100. However, the method is not limited to that embodiment.

The method of flowchart 700 is also premised on the assumption that the method of flowchart 500 has already been performed. Thus, there exists both the first build or design time output and the second build or design-time output that is a projection thereof. As shown in FIG. 7, the method of flowchart 700 begins at step 702 in which it is determined that the second build or design-time output has been modified. For example, this step may involve determining that one or more binaries or a log file of the second build environment has been modified.

At step 704, in response to the determination that the second build or design-time output has been modified, the first build or design-time output is automatically modified based on the modification to the second build or design-time output. For example, this step may entail modifying one or more binaries or a log file of the first build environment to reflect the change that was made to the second build or design-time output of the second build environment.

C. Exemplary Embodiments for the Projection of Build and Design-Time Inputs and Outputs Between Different Build Environments Hosted by the Same Computing Device The above subsections described embodiments for projecting build and design-time inputs and outputs between local and remote build environments. The embodiments of the above subsections may be modified to enable the projection of build and design-time inputs and outputs between different build environments hosted on the same computing device.

Figure 8:
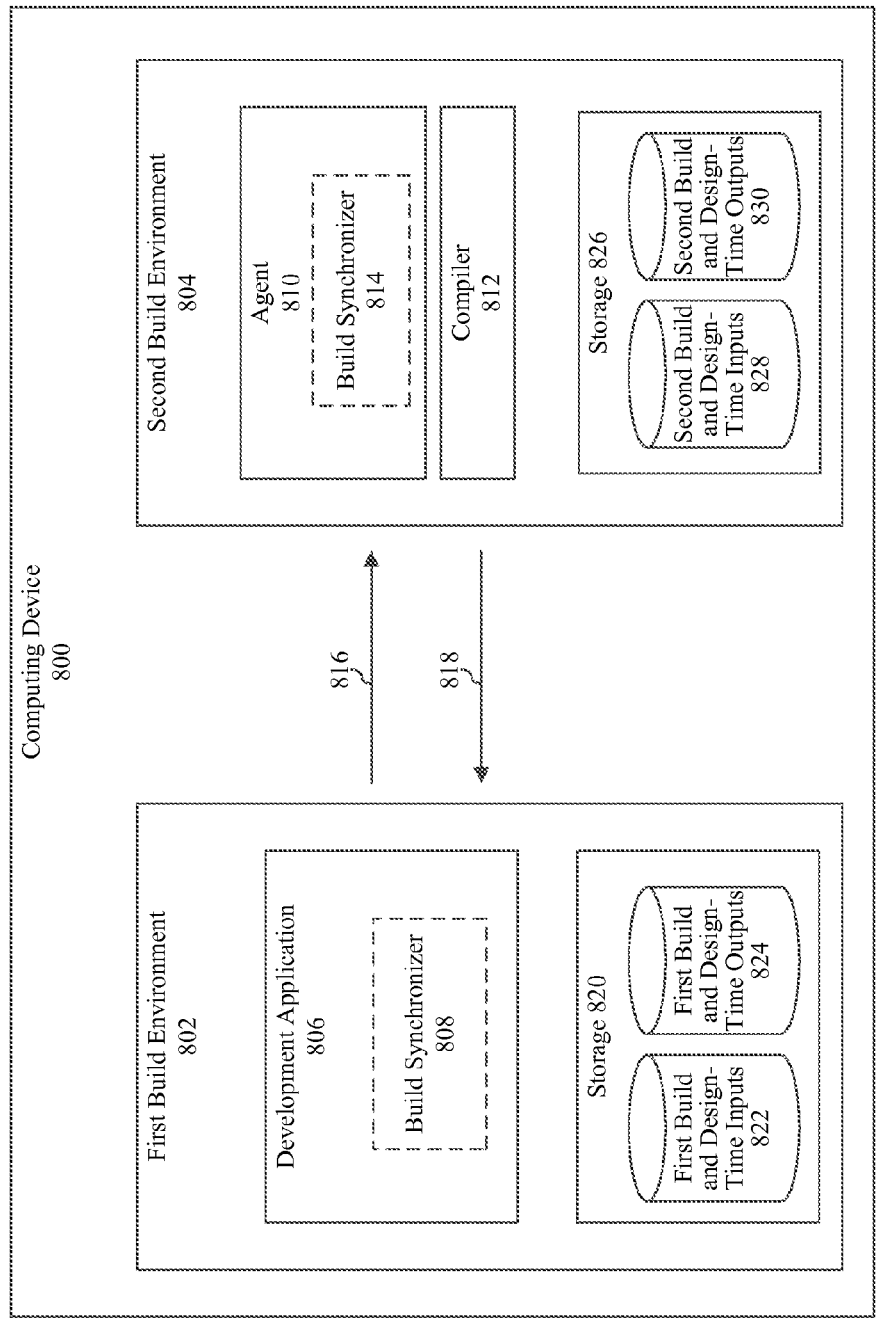
FIG. 8 is a block diagram of a software development system that enables the projection of build and design-time inputs and outputs between different build environments hosted on the same computing device, according to an example embodiment.

For example, it is possible that two different build environments may be hosted on the same underlying physical machine. For example, using well-known virtualization and emulation techniques, a single computing device may support two concurrently executing operating systems or operating system versions, each of which hosts its own build environment. For instance, FIG. 8 is a block diagram of a computing device 800 that hosts both a first build environment 802 and a second build environment 804. As shown in FIG. 8, first build environment 802 includes a development application 806 and storage 820 while second build environment includes an agent 810, a compiler 812, and storage 826. It is to be appreciated that storage 820 and storage 826 may each comprise a portion of the same underlying physical storage of computing device 800. As further shown in FIG. 8, development application 806 includes a build synchronizer 808 and/or agent 810 includes a build synchronizer 814. Storage 820 stores first build and design-time inputs 820 and first build and design-time outputs 824. Storage 826 stores second build and design-time inputs 828 and second build and design-time outputs 830.

Each of development application 806, agent 810 and compiler 812 may operate in a similar manner to development application 106, agent 110 and compiler 112 respectively as described above in reference to FIG. 1. Thus, development application 806 of first build environment 802 may communicate with agent 810 of second build environment 804 to cause a build to be performed at second build environment 804 on program code. The build at second build environment 804 may be performed during the process of developing an application to operate on second build environment 804, which may have differences from first build environment 104 (e.g., different device type, different operating system, different operating system version).

For example, development application 806 may transmit build generation information 816 to agent 810 for a particular application under development and agent 812 may instruct compiler 812 to perform a build based on build generation information 816. Communication between development application 806 and agent 810 may be carried out over one or more internal buses, interconnects or other communication infrastructure of computing device 800.

Through interaction with development application 806, a user may cause one or more first build and design-time inputs 822 to be generated or otherwise stored on computing device 800. Such inputs may include, for example and without limitation, source code files, assets that may be referenced by source code files (e.g., code libraries, content such as images, audio files, video files, and the like), build environment settings, and project files. In an embodiment, build synchronizer 808 is operable to project any such first build and design-time inputs 822 that are suitable for conducting a build in first build environment 802 to second build and design-time inputs 828 that are suitable for conducting a build in second build environment 804.

Furthermore, build synchronizer 808 may be configured to update one of second build and design-time inputs 828 in response to determining that a corresponding one of first build and design-time inputs 822 has been modified, wherein the update to the second build and design-time input reflects the modification to the first build and design-time input. Likewise, build synchronizer 808 may be configured to update one of first build and design-time inputs 822 in response to determining that a corresponding one of second build and design-time inputs 828 has been modified, wherein the update to the first build and design-time input reflects the modification to the second build and design-time input.

As noted above, a user of development application 806 may interact therewith to cause compiler 812 to perform a build based on build generation information 816. As a result of the performance of such a build, one or more second build and design-time outputs 830 may be generated, as well as transmitted to first build environment 802 as build output information 818. In an embodiment, build synchronizer 808 is operable to project any such second build and design-time outputs 830 that are meaningful in second build environment 804 to first build and design-time outputs 824 that are meaningful in first build environment 802.

Furthermore, build synchronizer 808 may be configured to update one of first build and design-time outputs 824 in response to determining that a corresponding one of second build and design-time outputs 830 has been modified, wherein the update to the first build and design-time output reflects the modification to the second build and design-time output. Likewise, build synchronizer 808 may be configured to update one of second build and design-time outputs 830 in response to determining that a corresponding one of first build and design-time inputs 824 has been modified, wherein the update to the second build and design-time output reflects the modification to the first build and design-time output.

Although the foregoing features relating to the projection of build and design-time inputs and outputs between first and second build environments are described as being performed by build synchronizer 808, it is to be understood that such features may alternatively be implemented by build synchronizer 814. In still further embodiments, such features may be handled in a distributed manner with various operations being performed by build synchronizer 808 and other operations being performed by build synchronizer 814.

Figure 9:
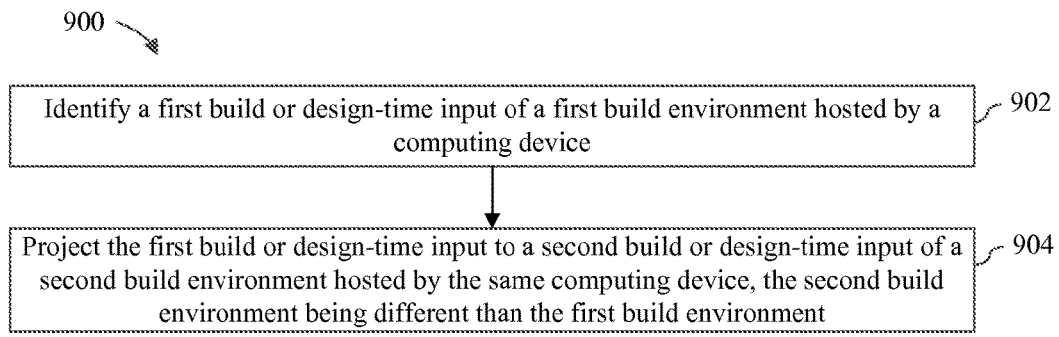
FIG. 9 is a flowchart of a first method for synchronizing a first build environment hosted by a computing device with a second build environment hosted by the same second computing device, according to an embodiment.

To help further illustrate a manner of operation of the embodiments described herein, FIG. 9 depicts a flowchart 900 of a first method for synchronizing a first build environment hosted by a computing device with a second build environment hosted by the same computing device, according to an embodiment. The steps of flowchart 900 may be performed, for example, by build synchronizer 808 and/or build synchronizer 814 as discussed above in reference to computing device 800. However, the method is not limited to that embodiment.

As shown in FIG. 9, the method of flowchart 900 begins at step 902 in which a first build or design-time input of a first build environment hosted by a first computing device is identified. As discussed above, the first build or design-time input may comprise, for example and without limitation, a project file, a source code file, an asset referenced by a source code file, or build environment settings.

At step 904, the first build or design-time input is projected to a second build or design time input of a second build environment hosted by the same computing device, wherein the second build environment is different than the first build environment. The differences between the first build environment and the second build environment may include, but are not limited to, different operating systems, different file systems and file system resource paths, different compilers, different build engines, or the like. Projecting the first build or design-time input to the second build or design-time input may comprise automatically creating a second build or design-time input that has a different form and/or a different content than the first build or design-time input or selectively modifying one or more portions of the first build or design-time input to produce the second build or design-time input.

Figure 10:
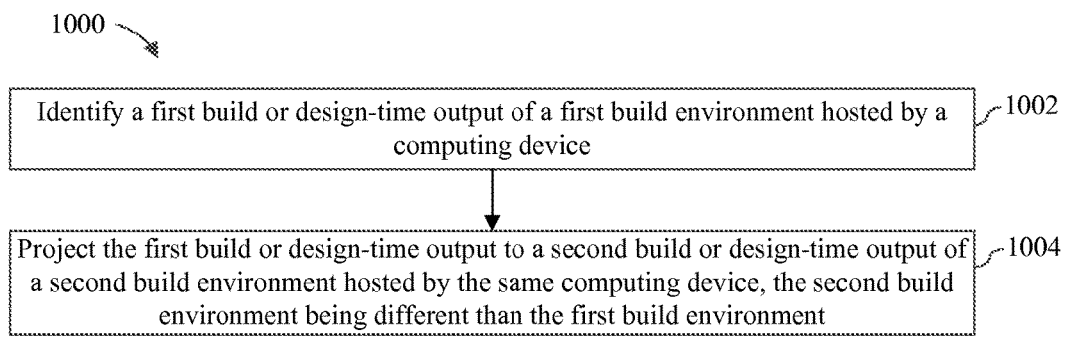
FIG. 10 is a flowchart of a second method for synchronizing a first build environment hosted by a computing device with a second build environment hosted by the same computing device, according to an embodiment.

FIG. 10 depicts a flowchart 1000 of a second method for synchronizing a first build environment hosted by a computing device with a second build environment hosted by the same computing device, according to an embodiment. The steps of flowchart 1000 may be performed, for example, by build synchronizer 808 and/or build synchronizer 814 as discussed above in reference to system 800. However, the method is not limited to that embodiment.

As shown in FIG. 10, the method of flowchart 1000 begins at step 1002 in which a first build or design-time output of a first build environment hosted by a computing device is identified. As discussed above, the first build or design-time output may comprise, for example and without limitation, one or more binaries or a log file.

At step 1004, the first build or design-time output is projected to a second build or design-time output of a second build environment hosted by the sme computing device, wherein the second build environment is different than the first build environment. The differences between the first build environment and the second build environment may include, but are not limited to, different operating systems, different file systems and file system resource paths, different compilers, different build engines, or the like. Projecting the first build or design-time output to the second build or design-time output may comprise automatically creating a second build or design-time output that has a different form and/or a different content than the first build or design-time output or selectively modifying one or more portions of the first build or design-time output to produce the second build or design-time output.

III. Example Computer System Implementation

Figure 11:
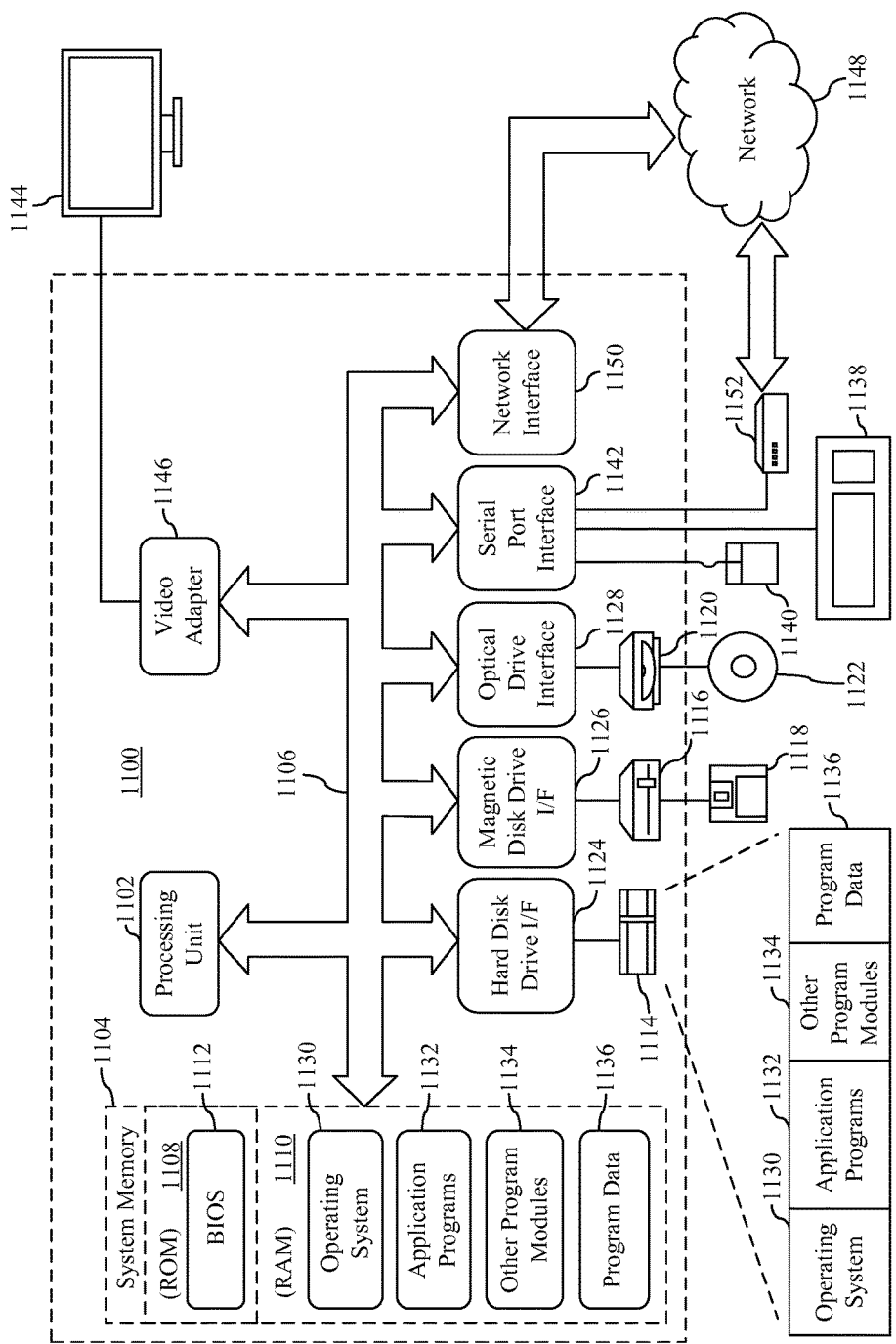
FIG. 11 is a block diagram of an example processor-based computer system that may be used to implement various embodiments.

FIG. 11 depicts an example processor-based computer system 1100 that may be used to implement various embodiments described herein. For example, system 1100 may be used to implement master computing device 102 and/or slave computing device 104 as described above in reference to FIG. 1 or computing device 800 as described above in reference to FIG. 8. System 1100 may also be used to implement any or all of the steps of any or all of the flowcharts depicted in FIGS. 2-7, 9 and 10. The description of system 1100 provided herein is provided for purposes of illustration, and is not intended to be limiting. Embodiments may be implemented in further types of computer systems, as would be known to persons skilled in the relevant art(s).

As shown in FIG. 11, system 1100 includes a processing unit 1102, a system memory 1104, and a bus 1106 that couples various system components including system memory 1104 to processing unit 1102. Processing unit 1102 may comprise one or more microprocessors or microprocessor cores. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, BLU-RAY™ disk or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all of the functions and features of master computing device 1102 or slave computing device 1104 as described above in reference to FIG. 1 or computing device 800 as described above in reference to FIG. 8. The program modules may also include computer program logic that, when executed by processing unit 1102, performs any of the steps or operations shown or described in reference to the flowcharts of FIGS. 2-7, 9 and 10.

A user may enter commands and information into system 1100 through input devices such as a keyboard 1138 and a pointing device 1140 (e.g., a mouse). Other input devices (not shown) may include a microphone, joystick, game controller, scanner, or the like. In one embodiment, a touch screen is provided in conjunction with a display 1144 to allow a user to provide user input via the application of a touch (as by a finger or stylus for example) to one or more points on the touch screen. These and other input devices are often connected to processing unit 1102 through a serial port interface 1142 that is coupled to bus 1106, but may be connected by other interfaces, such as a parallel port, game port, or a universal serial bus (USB). Such interfaces may be wired or wireless interfaces.

Display 1144 is connected to bus 1106 via an interface, such as a video adapter 1146. In addition to display 1144, system 1100 may include other peripheral output devices (not shown) such as speakers and printers.

System 1100 is connected to a network 1148 (e.g., a local area network or wide area network such as the Internet) through a network interface 1150, a modem 1152, or other suitable means for establishing communications over the network. Modem 1152, which may be internal or external, is connected to bus 1106 via serial port interface 1142.

As used herein, the terms "computer program medium," "computer-readable medium," and "computer-readable storage medium" are used to generally refer to memory devices or storage structures such as the hard disk associated with hard disk drive 1114, removable magnetic disk 1118, removable optical disk 1122, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable system 1100 to implement features of embodiments discussed herein. Accordingly, such computer programs represent controllers of the system 1100.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1100 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Further Example Embodiments

A first computing device is described herein. The first computing device comprises at least one processor circuit and at least one memory that stores program code configured to be executed by the at least one processor circuit. The program code comprises a build synchronizer configured to project a first build or design-time input generated by a first build environment hosted on the first computing device to a second build or design-time input of a second build environment hosted on a second computing device. The first build environment is different than the second build environment.

In one embodiment of the first computing device, the first build environment is different than the second build environment in at least that the first build environment is executed on a different operating system than the second build environment.

In another embodiment of the first computing device, the first build environment is different than the second build environment in at least that the first build environment and the second build environment are executed on different versions of the same operating system.

In yet another embodiment of the first computing device, the first build or design-time input comprises one of a project file, a source code file, an asset referenced by a source code file, or one or more build environment settings.

In still another embodiment of the first computing device, the build synchronizer is further configured to determine that the second build or design-time input has been modified and to update the first build or design-time input based on the modification to the second build or design-time input.

In a further embodiment of the first computing device, the build synchronizer is further configured to determine that the first build or design-time input has been modified and to update the second build or design-time input based on the modification to the first build or design-time input.

Another first computing device is described herein. The first computing device comprises at least one processor circuit and at least one memory that stores program code configured to be executed by the at least one processor circuit. The program code comprises a build synchronizer configured to project a first build or design-time output generated by a first build environment hosted on the first computing device to a second build or design-time output of a second build environment hosted on a second computing device. The first build environment is different than the second build environment.

In one embodiment of the first computing device, the first build environment is different than the second build environment in at least that the first build environment is executed on a different operating system than the second build environment.

In another embodiment of the first computing device, the first build environment is different than the second build environment in at least that the first build environment and the second build environment are executed on different versions of the same operating system.

In yet another embodiment of the first computing device, the first build or design-time output comprises one of one or more binaries or a log file.

In still another embodiment of the first computing device, the build synchronizer is further configured to determine that the second build or design-time output has been modified and to update the first build or design-time output based on the modification to the second build or design-time input.

In a further embodiment of the first computing device, the build synchronizer is further configured to determine that the first build or design-time output has been modified and to update the second build or design-time output based on the modification to the first build or design-time input.

A method for synchronizing a computer-implemented first build environment with a computer-implemented second build environment is described herein. The first build environment is different than the second build environment. The method comprises identifying a first build or design-time input or output of the first build environment, and projecting the first build or design-time input or output to a second build or design-time input or output of the second build environment.

In one embodiment of the method, the first build environment is different than the second build environment in at least that the first build environment is executed on a different operating system than the second build environment.

In another embodiment of the method, the first build environment is different than the second build environment in at least that the first build environment and the second build environment are executed on different versions of the same operating system.

In yet another embodiment of the method, the first build environment is hosted on a different computing device than the second build environment.

In still another embodiment of the method, the first build environment is hosted on the same computing device as the second build environment.

In a further embodiment of the method, the first build or design-time input comprises one of a project file, a source code file, an asset referenced by a source code file, or one or more build environment settings.

In a still further embodiment of the method, the first build or design-time output comprises one of one or more binaries or a log file.

In another embodiment of the method, the method further comprises determining that the first build or design-time input or output was modified and updating the second build or design-time input or output based on the modification to the first build or design-time input or output.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A first computing device, comprising:
   at least one processor circuit; and
   at least one memory that stores program code configured to be executed by the at least one processor circuit, the program code comprising:
   a build synchronizer configured to project a first build or design-time input generated by a first build environment hosted on the first computing device to a second build or design-time input of a second build environment hosted on a second computing device by automatically generating the second build or design-time input, the first build or design-time input having a first form and/or content suitable for the first build environment and not suitable for the second build environment, the second build or design-time input having a second form and/or content suitable for the second build environment, the first build environment being different than the second build environment, the first build or design-time input comprising a local asset referenced by a source code file and encoded in a first file format that renders successfully in the first build environment and does not render successfully in the second build environment,
   the second build or design-time input comprising a remote asset that is encoded in a second file format that does render successfully in the second build environment, and
   the automatically generating the second build or design-time input comprising selectively modifying one or more portions of the local asset.

2. The first computing device of claim 1, wherein the first build environment is different than the second build environment in at least that the first build environment is executed on a different operating system than the second build environment.

3. The first computing device of claim 1, wherein the first build environment is different than the second build environment in at least that the first build environment and the second build environment are executed on different versions of the same operating system.

4. The first computing device of claim 1, wherein the first build or design-time input further comprises one or more of:
   a source code file;
   a project file; or
   one or more build environment settings.

5. The first computing device of claim 1, wherein the build synchronizer is further configured to determine that the second build or design-time input has been modified and to update the first build or design-time input based on the modification to the second build or design-time input.

6. The first computing device of claim 1, wherein the build synchronizer is further configured to determine that the first build or design-time input has been modified and to update the second build or design-time input based on the modification to the first build or design-time input.

7. The first computing device of claim 1, wherein the first build environment is different than the second build environment in at least that the first build environment has different file system or file system resource paths than the second build environment.

8. A method for synchronizing a computer-implemented first build environment with a computer-implemented second build environment, the method comprising:
   identifying a first build or design-time input of the first build environment hosted by a first computing device; and
   projecting the first build or design-time input to a second build or design-time input of the second build environment hosted on a second computing device by automatically generating the second build or design-time input, the first build or design-time input having a first form and/or content suitable for the first build environment and not suitable for the second build environment, the second build or design-time input having a second form and/or content suitable for the second build environment, the first build environment being different than the second build environment, the first build or design-time input comprising an asset referenced by a source code file and encoded in a first file format that renders successfully in the first build environment and does not render successfully in the second build environment,
   the second build or design-time input comprising a remote asset that is encoded in a second file format that does render successfully in the second build environment, and
   the automatically generating the second build or design-time input comprising selectively modifying one or more portions of the local asset.

9. The method of claim 8, wherein the first build environment is different than the second build environment in at least that the first build environment is executed on a different operating system than the second build environment.

10. The method of claim 8, wherein the first build environment is different than the second build environment in that at least the first build environment and the second build environment are executed on different versions of the same operating system.

11. The method of claim 8, wherein the first build or design-time input further comprises one or more of:
   a source code file;
   a project file; or
   one or more build environment settings.

12. The method of claim 8, further comprising:
   determining that the first build or design-time input was modified; and updating the second build or design-time input based on the modification to the first build or design-time input.

13. The method of claim 8, further comprising:
determining that the second build or design-time input was modified; and
updating the first build or design-time input based on the modification to the second-build or design-time input.

14. A computer program product comprising a computer-readable storage device having computer program logic recorded thereon that when executed by a processor-based computer system causes the processor-based system to perform a method, the method comprising:
identifying a first build or design-time input of the first build environment hosted by a first computing device; and
projecting the first build or design-time input to a second build or design-time input of the second build environment by automatically generating the second build or design-time input, the first build or design-time input having a first form and/or content suitable for the first build environment and not suitable for the second build environment, the second build or design-time input having a second form and/or content suitable for the second build environment, the first build environment being different than the second build environment, the first build or design-time input comprising an asset referenced by a source code file and encoded in a first file format that renders successfully in the first build environment and does not render successfully in the second build environment,
the second build or design-time input comprising a remote asset that is encoded in a second file format that does render successfully in the second build environment, and
the automatically generating the second build or design-time input comprising selectively modifying one or more portions of the local asset.

15. The computer program product of claim 14, wherein the first build environment is different than the second build environment in at least that the first build environment is executed on a different operating system than the second build environment.

16. The computer program product of claim 14, wherein the first build environment is different than the second build environment in that at least the first build environment and the second build environment are executed on different versions of the same operating system.

17. The computer program product of claim 14, wherein the first build environment is different than the second build environment in that at least the first build environment has different file system or file system resource paths than the second build environment.

18. The computer program product of claim 14, wherein the first build or design-time input further comprises one or more of:
a source code file;
a project file; or
one or more build configuration settings.

19. The computer program product of claim 14, further comprising:
determining that the first build or design-time input was modified; and
updating the second build or design-time input based on the modification to the first build or design-time input.

20. The computer program product of claim 14, further comprising:
determining that the second build or design-time input was modified; and
updating the first build or design-time input based on the modification to the second-build or design-time input.

* * * * *